United States Patent [19]

French

[11] Patent Number: 5,735,742

[45] Date of Patent: *Apr. 7, 1998

[54] GAMING TABLE TRACKING SYSTEM AND METHOD

[75] Inventor: John French, San Clemente, Calif.

[73] Assignee: Chip Track International, Carson City, Nev.

[*] Notice: The term of this patent shall not extend beyond the expiration date of Pat. No. 5,651,548.

[21] Appl. No.: 530,833

[22] Filed: Sep. 20, 1995

[51] Int. Cl.$^6$ .................................................. A63F 9/24
[52] U.S. Cl. ..................... 463/25; 463/29; 463/12; 463/13; 273/138.2; 273/309; 273/288; 40/27.5; 364/412
[58] Field of Search .................. 273/138.2, 237, 273/238, 309, 288; 463/25, 29, 12, 13, 22; 40/27.5; 364/412; 194/214

[56] References Cited

U.S. PATENT DOCUMENTS

| | | | |
|---|---|---|---|
| 3,766,452 | 10/1973 | Burpee et al. | 40/27.5 |
| 4,755,941 | 7/1988 | Bacchi | 364/412 |
| 4,818,855 | 4/1989 | Mongeon et al. | 235/440 |
| 5,007,641 | 4/1991 | Seidman | 273/139 |
| 5,159,549 | 10/1992 | Hallman, Jr. et al. | 463/26 |
| 5,166,502 | 11/1992 | Rendleman et al. | 235/492 |
| 5,179,517 | 1/1993 | Sarbin et al. | 364/410 |
| 5,265,874 | 11/1993 | Dickinson et al. | 463/25 |

OTHER PUBLICATIONS

"Tagging Along" European Retail IT Decisions, pp. 39–41.
"Goodbye UPC—A?" ID Systems, Sep. 1994, vol. 14 No. 9, p. 14.
"Introduction to the Intellignet Tagging System" ASGI.
"The ASGI Tag a Muliple–Read Active Transponder" Intelligent Tagging System.
"Intelligent Tagging System Multiple–Read Active Tag" ASGI.
"Neuro Tag System Multiple–Read Active Tag" ASGI.
"Avid Mini TracKer" Avid.
"Power Tracker II All Weather Extended Range Multi Tag Reader" Avid.
"Avid Industrial RF/ID Transponders" Avid.
"Innovative Supertag Moves One Step Closer to Reality" British Technology Group Ltd., News Release, Jul. 11, 1994.
"Automated Identificatin Systems" COTAG.
"Automated Identificatin Systems—The Power of Programming" COTAG.
"Hands Free Access Control—Coded Tags" COTAG.
"Racom Introduces Next Generation Contactless Card System" Racom Systems, Inc. Press Release Jan. 30, 1995.
"LFM Series Contactless Digital Memory Cards" Racom Systems, Inc.
"Los Angeles Begins Trial of Racom's Contactless Smart Cards" Racom Systems, Inc. Press Release May 10, 1994.

(List continued on next page.)

Primary Examiner—Benjamin H. Layno
Attorney, Agent, or Firm—Donald E. Stout

[57] ABSTRACT

A fully automated accounting system accurately and automatically monitors and records all gaming chip transactions in a casino. The system employs a gaming chip having a transponder embedded therein and has an ongoing and "on-command" ability to provide an instantaneous inventory of all of the gaming chips in the casino, including those in storage in the vault as well as the chips in the cashiers cage and at each gaming table on the casino floor. The system is capable of reporting the total value of the gaming chips at any location, as well as the value of any particular transaction at any gaming table or at the cashiers cage. Optionally, the transaction history of each chip may be maintained in a data base embedded in the chip (or alternatively in a central computer), and read each time the gaming chip is scanned by a special antenna. If the chip is not where it is supposed to be according to its recorded transactional history (for example, a vault chip shows up on a gaming table without having passed through the cashiers cage), it will be identified and may be invalidated by nullifying a special casino security code.

26 Claims, 7 Drawing Sheets

OTHER PUBLICATIONS

"Racom Systems Supplies Contactless Smart Cards for Manchester, England" Racom Systems, Inc. Press Release Apr. 4, 1994.

"Antenna Models 5170, 5160, 5140" Telsor.

"Telsor Industrial RFID Systems—Functional Information" Telsor.

"Telsor RFID Systems 4 Major Components" Telsor.

"Tags" Telsor.

"Interface Model 3030, Display Reader" Telsor.

"Personal Identification Devices" Telsor.

GAMING TABLE TRACKING SYSTEM AND METHOD

This application is related to co-pending application Ser. No. 08/444,566, now U.S. Pat. No. 5,651,548, filed on May 19, 1995 and entitled *Gaming Table Tracking System and Method,* herein incorporated by reference.

BACKGROUND OF THE INVENTION

Casinos have been subject to a variety of devious unlawful schemes pursuant to which the perpetrators attempt to fraudulently obtain money or credits from the casino. In one such scheme, a blackjack dealer may arrange with a co-conspirator to allow the co-conspirator to "win" large amounts from the house. Individual players have also devised unlawful schemes enabling them to "win" at various gaming tables including blackjack and craps. Still other schemes involve the theft or misuse of gaming chips, which are played in the games and are considered legal tender throughout the casino.

Gaming chips are typically stored in the casino vault, then transferred as needed into the cashiers cage. Anyone possessing chips, such as players or other retail establishments accepting the chips as legal tender, may exchange those chips for cash at the cashiers cage. Additionally, chips are transferred by casino employees known as "runners" from the cashiers cage to the various gaming tables on the casino floor. The dealer at each gaming table maintains a bankroll, from which he distributes chips to players when they win and into which he collects chips from losing players. He also provides chips to players in exchange for cash. With so many chip transactions throughout the casino, there are obviously many ways to cheat the house or other players by theft or other misuse of chips. For example, a casino employee may steal chips stored in the vault for personal use or for black market sale to unscrupulous players. Chips may similarly be stolen by employees in the cashiers cage, at the gaming tables, or by runners en route between locations. Another common occurrence is a so-called "snatch and run", where chips are snatched from a gaming table or a player, and the thief then escapes by running into the crowd. Yet another problem is that of counterfeit gaming chips. As a consequence, casinos expend considerable time and effort in manually observing players, game operators, and other casino employees in an effort to make certain that all of the games are fairly played and that chip theft and the use of unauthorized or counterfeit chips is kept to a minimum. Such matters as the amount of a player's buy-in, the time played, the average bet of the player, and a player's win-loss record are often tracked. Of course, such techniques are labor intensive and only partially effective.

It is known to embed a radio frequency transponder in a gaming chip, and one such construction is shown in U.S. Pat. No. 5,166,502 to Rendleman et al. The transponder can be tagged with information concerning the chip, such as the chip identity and value. According to this patent, a reading device can be placed in a slot machine to prevent the use of counterfeit gaming chips in the slot machine. However, this does not address the many schemes that have been devised to cheat the house on the gaming tables, it does not deal with problems of chip theft, and there is no ability to alter the information recorded on the chip.

It is also known to employ machine readable identification cards for players of slot machines. This enables a computer to track various information about the player of the slot machine such as that player's win-loss record against the slot machine, the total dollar amount played, the number of times that player played the slot machines, the amount paid out to the player, and the number of hours played. This information can then be used to award complimentary features known as "comps" or credits to the player. However, again, this system does not apply to play at the gaming tables and does not address the other problems previously discussed.

What is needed, therefore, is a system for accurately and automatically tracking the flow and history of gaming chips through a casino which also has the ability to correlate chips to players and dealers, to void chips under certain circumstances, and to instantaneously and conveniently calculate the value of chip transactions at any particular time and location.

SUMMARY OF THE INVENTION

This invention solves the problems outlined above by providing a fully automated accounting system for accurately and automatically monitoring and recording all gaming chip transactions in a casino. The system provides an ongoing and "on-command" ability to provide an instantaneous inventory of all of the gaming chips in the casino, including those in storage in the vault as well as the chips in the cashiers cage and at each gaming table on the casino floor. The system is capable of reporting the total value of the gaming chips at any location, as well as the value of any particular transaction at any gaming table or at the cashiers cage. Optionally, the transaction history of each chip may be maintained in a data base embedded in that chip (or alternatively in a central computer), and read each time the gaming chip is scanned by a special antenna. If the chip is not where it is supposed to be according to its recorded transactional history (for example, a vault chip shows up on a gaming table without having passed through the cashiers cage), it will be identified and may be invalidated by nullifying a special casino security code, if desired. Another optional feature is to record the identity of players at the gaming tables, as is presently often done for slot machine players, using machine readable cards. This identification data is then correlated with data obtained by recording a player's gaming chip transactions to enable the system to automatically rate the player. Such a rating system may be useful for detecting dishonest players (those betting unusual amounts or having abnormally high winning percentages), and may also be used to award "comps" to players, without the need for labor-intensive evaluation by pit personnel.

The inventive system is particularly valuable for its ability to reduce theft and fraud on the casino floor, while also reducing the need for large numbers of pit employees to manually monitor activities at the various gaming tables. In particular, security personnel monitoring the system may be alerted to unusual transactions at the gaming tables by alarms or by the activation of security cameras, and may then determine an appropriate course of action, such as alerting or correcting the dealer, observing continued play, contacting authorities, or invalidating gaming chips. If gaming chips are stolen, the system can identify and instantly invalidate the affected chips, or, if the chips are not scannable (because they are not sufficiently close to a system antenna), they can be denoted as invalid in centralized system data base. Furthermore, if a blackout or other emergency occurs, all of the scannable gaming chips can be automatically invalidated, or invalidated on command, in order to prevent widespread theft from the tables, players, or other locations during the resultant confusion.

Many other uses for the inventive system are possible as well, to be limited only by the imagination of its users.

More particularly, a gaming chip for casino use is provided which comprises a body and a transponder carded within the body. The transponder is encoded with permanent read-only identification information and further includes a data bank for receiving and maintaining changeable information transmitted thereto from an RF antenna. The changeable information may include a voidable casino security code, so that a chip may easily be voided if fraud is suspected, as well as a transactional history of the chip within the casino.

In another aspect of the invention, a system for tracking movement of gaming chips within a casino is provided, wherein the gaming chips carry electronically ascertainable information about the gaming chips and the casino comprises a vault for receiving and storing gaming chips, a cashiers cage for disbursing and cashing out gaming chips, and a plurality of gaming tables. The system comprises at least one antenna associated with the vault for scanning gaming chips entering and leaving the vault, at least one antenna associated with the cashiers cage for scanning gaming chips entering and leaving the cashiers cage, and at least one antenna associated with the gaming tables, for scanning gaming chips at the tables. It is preferred that the scanning step in the vault include the step of encoding the data bank in the chip with a voidable casino security code, so that the chip may be easily invalidated automatically if desired, and that it further includes the step of recording movement of the chip between locations, so that a transactional history of the chip is preserved in a data bank carried by the chip.

In another aspect of the invention, a method of tracking movement of gaming chips in a casino is provided, which includes the steps of electronically identifying an electronically identifiable gaming chip at a first location within the casino, moving the gaming chip from the first location to a second location within the casino, and recording the movement of the gaming chip from the first location to the second location in a data bank so that the transactional history of the gaming chip is preserved for future reference.

The invention, together with additional features and advantages thereof, may best be understood by reference to the following description taken in connection with the accompanying illustrative drawings.

DESCRIPTION OF THE PREFERRED EMBODIMENT

Figure 1:
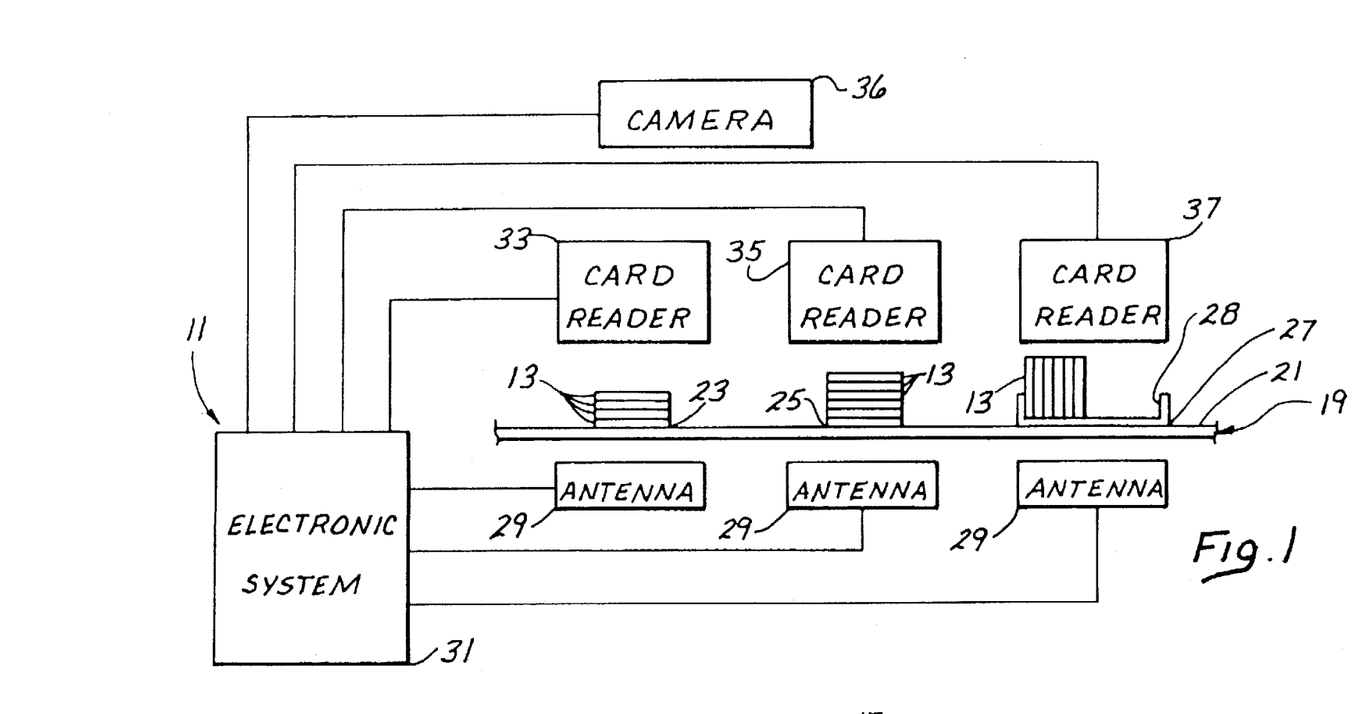
FIG. 1 is a schematic illustration of a system constructed in accordance with the teachings of this invention.
Figure 2:
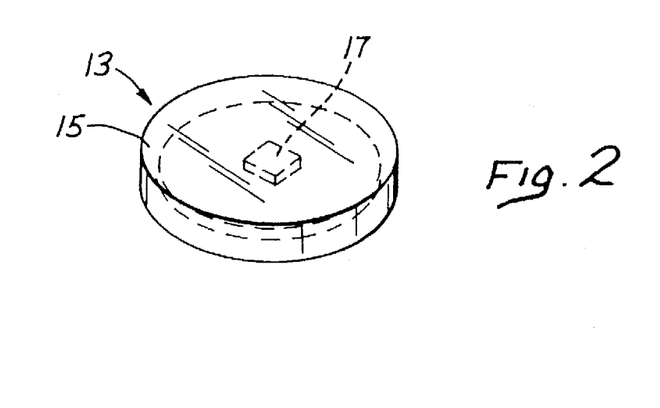
FIG. 2 is a somewhat schematic perspective illustration of a chip of the type usable with this invention.

FIG. 1 shows a system 11 for tracking movement of gaming chips 13 and for performing other valuable functions. The gaming chips 13 which are adapted for use with the present invention are electronically identifiable and carry electronically ascertainable information about the gaming chip. Generally, each of the gaming chips 13 (FIG. 2) includes a body 15 and an electronic tag or transponder 17 within and carried by the body. The tag 17 carries electronically ascertainable information about the chip, some of which is in read-only format and some of which is in read-write (changeable) format, as will be described in greater detail below. The read-only information may include the chip's identification number and the value of the chip in the casino. The changeable or updatable information may include the transactional history of the chip within the casino, for example, and/or a voidable casino security code. Each of the gaming chips 13 has its own identification number and so in that sense is unique. The tag 17 includes an electronic circuit which includes an electronic chip and an antenna. The tag may also include a battery, which when activated provides energy for transmitting a signal from the tag. When the tag 17 is interrogated by an appropriate signal from an antenna, it responds by sending a signal representative of the information stored in the circuit. Tags of this type, and the associated equipment needed to obtain the information from the tags and to write new information to the tags are known and are available, for example, from Telsor of Englewood, Col. or Advanced Systems Group International (ASGI) of Herndon, Va.

It is preferred that the tag 17 is of the type which permits batch scanning, i.e. scanning a whole group of the ginning chips 13 during one time interval with a radio beam. This beam illuminates all of the tags 17 and requires them to broadcast the electronically ascertainable information carried thereby. The radio beam provides energy to the tag or transponder 17, thereby enabling the tags to broadcast this information. This technology is available, for example, from British Technology Group, Ltd. of London as Supertag and from ASGI of Herndon, Va.

The system 11 includes a gaming table 19 (FIG. 1) having a surface 21 and gaming chip placement areas 23, 25, and 27. The gaming table 19 may be of any kind including the gaming tables referred to above. Any desired number of the gaming chip placement areas may be utilized, and the three illustrated in FIG. 1 are purely illustrative. The gaming chip areas 23, 25, and 27 may be at various different locations within the casino, such as on a gaming table, on a gaming chip tray, in the cashier's cage, in the casino vault, etc. In the example shown in FIG. 1, the gaming chip areas 23 and 25 are on the surface 21 of the gaming table 19 and the gaming chip placement area 27 is on a dealer's chip tray 28.

The system 11 also includes a plurality of antennas 29, one for each of the gaming chip areas 23, 25, and 27. The antennas 29 are cooperable with the tags 17 in the gaming chips 13 for both obtaining information from and writing information to the tags of the gaming chips at the associated gaming chip placement area and requires the tags to broadcast the information stored in the tags. The antennas 29 also provide the tags 17 with the energy to accomplish this. The British Technology tag and system referred to above employ a protocol which prevents reader jamming that would tend to occur if a plurality of the tags 17 responded simultaneously to the command from the associated antenna. Consequently, each gaming chip 13 of the stack of gaming chips at, for example, the gaming chip placement area 23 can then be identified while all of such gaming chips are at such gaming chip placement area. A batch reading system such as this is preferred. However, single tag readers could be employed for games in which only a single gaming chip is placed on a gaming chip placement area.

The system 11 also includes an electronic system 31 which provides all of the other known functions to enable the antennas 29 to scan the tag 17 at the gaming chips 13 at the associated gaming chip placement area and to receive, process and store the information so obtained. The system 31 also enables the antennas 29 to transmit and write any new desired information to the tags 17 of each gaming chip 13. The electronic system is coupled to the read-write antennas 29 and the location of each of the chips 13 when they are at the gaming chip placement areas 23, 25 and 27 is stored in the electronic system 31. Of course, the electronic system 31 can be coupled to any number of antennas 29 which may be located at various different locations throughout the casino including at many gaming tables.

The electronic system 31 is also coupled to conventional card readers 33 (FIG. 2) placed in association with the gaming chip placement areas 23, 25, and 27, respectively. By inserting a machine readable identification card into one of the card readers 33, a signal is transmitted to the electronic system 31 identifying the person that is using the associated gaming chip placement area. For example, if a player inserts his card into the card reader 33, the system 11 knows the particular player utilizing the gaming chip placement area 23. If, for example, a game operator inserts his card into the card reader 35, the system 11 knows that it is that particular game operator who is responsible for the gaming chip placement area 25.

The electronic system 31, in addition to providing the necessary interface and read-write functions common to the antenna-tag systems, also includes a computer for performing the various other data processing and related functions that are required. As such, the computer may be programmed in part in a manner similar to the computers now used for tracking various information as to slot machine playing activity referred to above.

The system 11 shown schematically in FIG. 1 can be used to provide a number of valuable functions in a casino. For example, the system 11 can be used to track the movement of gaming chips. This can be accomplished by electronically identifying each gaming chip 13 at, for example, the gaming chip area 23 so that the electronic system 31 knows specifically which chips are at the gaming area 23. If one or more of those chips should be moved to another gaming chip placement area, such as the area 25, that chip can then be electronically identified utilizing the associated antenna 29. Consequently, the movement of the gaming chips from the area 23 to the area 25 as well as to other gaming chip areas within the casino can be accomplished.

The system 11 can also be used to identify the value of the gaming chips 13 which are at each of the gaming chip placement areas 23, 25 and 27. The electronic system 31 has a processor which sums the values of the gaming chips at each of these gaming chip placement areas during a given time period. Consequently, if the gaming chip placement area 23 is a player's bet placement area, the total value of chips played by a player identified by the associated card reader 33 over a given time period can be ascertained. In addition, by identifying the game operator associated with the game table 27 utilizing, for example, the card reader 37 and the game operator's identification card, the electronic system 31 can compile and store the game operator's win-loss record and average bet as well as the game operator's win-loss record against each of the players at the game table 19.

The system 11 may also include a camera 36 coupled to the electronic system 31. The electronic system 31 will turn the camera on in response to a particular signal or information obtained from any one or more of the antennas 29. For example, the camera 36 may be activated by the electronic system 31 in response to a signal from the antenna 29 indicating that the gaming chip placement area 23 has more than a predetermined value of chips. The camera 36 will be trained on at least the gaming table 19 or the portion of the gaming table which gave rise to the signal which called for surveillance.

Figure 3:
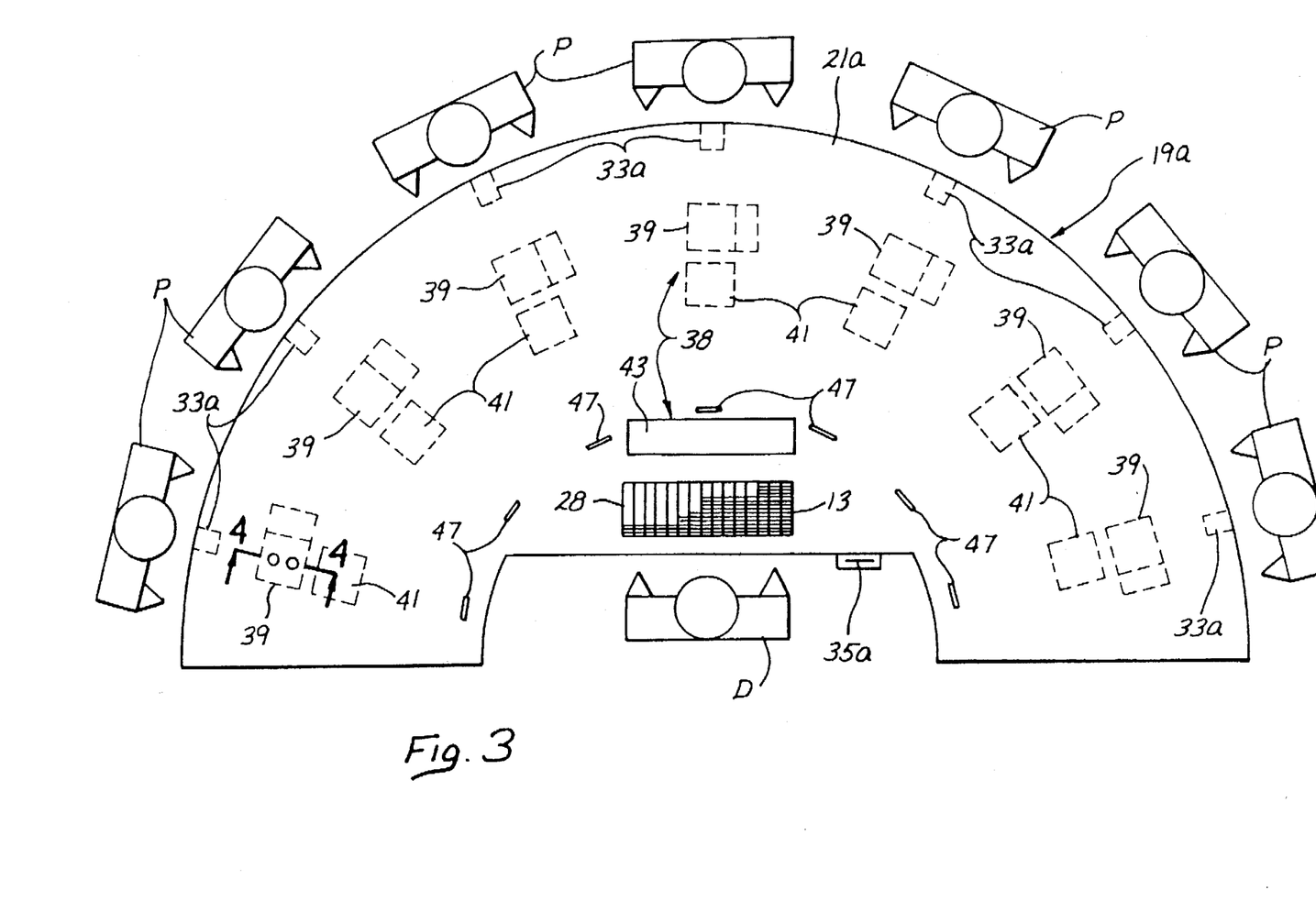
FIG. 3 is a schematic plan view of a blackjack table constructed in accordance with the teachings of this invention.

FIG. 3 shows a gaming table 19a in the form of a blackjack table. The blackjack table 19a can be used in the system of FIG. 1 in place of the schematically illustrated gaming table 19 and many portions of the blackjack table 19a corresponding to portions of the gaming table 19 are designated by corresponding reference numerals followed by the letter "a". The blackjack table 19a may be of a conventional generally semicircular configuration in plan and its upper surface 21a may have indicia 38 that adapts the surface 21a for playing blackjack. The indicia 38 may provide, for example, a variety of gaming chip placement areas including player bet placement areas 39 and player win placement areas 41 for players P. The areas 39 and 41 are arranged in pairs with one pair being provided for each playing station, and seven such playing stations are shown in FIG. 3. Also associated with each player station is a card reader 33 which may, if desired, be mounted on the table 19a.

The table 19a also has a game operator or dealer station and a card reader 35a at the dealer station for identification of a dealer D. The indicia 38 on the surface 21a also provide a gaming chip placement area in the form of chips for cash area 43. The chip tray 28 containing gaming chips 13 is also provided at the dealer station. The table 19a may also include a plurality of bet amount displays 47 associated with the player stations, respectively, to automatically display the value of the gaming chips placed in the player bet placement areas 39.

Figure 4:
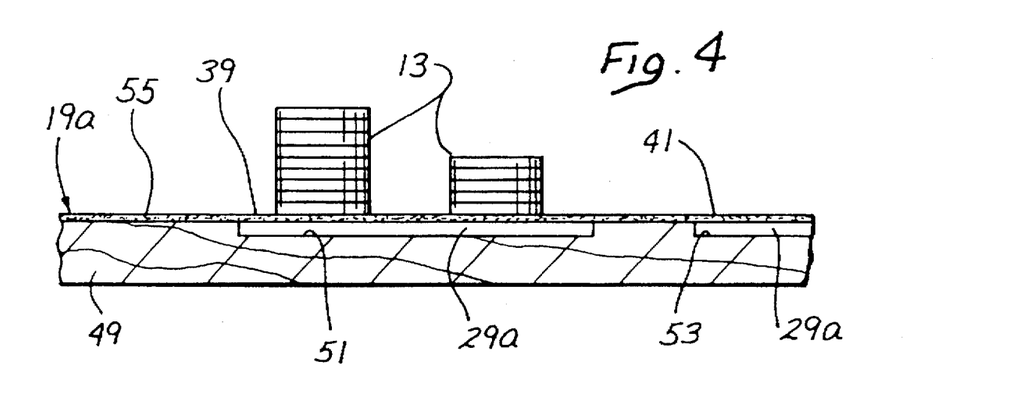
FIG. 4 is an enlarged fragmentary sectional view taken generally along line 4—4 of FIG. 3.

The areas 39, 41 and 43 are indicated by appropriate lines or marks on the upper surface 21a of the gaming table 19a. However, in order to obtain information from gaming chips on these areas, it is necessary that one antenna be provided for each of these areas and preferably positioned closely adjacent to the associated area. FIG. 4 shows a preferred construction in which the gaming table 19a comprises a horizontal top member 49 of a suitable material having upwardly opening cavities 51 and 53 for receiving antennas 29a, respectively. The top member 49 is covered with a layer 55 of felt or other suitable material, and this material also covers the cavities 51 and 53 and the antennas 29a. The indicia 38 which define the ginning chip placement areas 39 and 41 is provided on the felt. A similar construction can be employed for the placement of an antenna in the top member 29 beneath the layer 55 at the chips for cash area 43.

In use, the antennas 29a for each of the areas 39, 41 and 43 and the card readers 33a and 35a are suitably coupled to the electronic system 31 of FIG. 1. Consequently, the identity of each of the players and of the game operator is known, as well the amount bet by each of the players on the associated bet placement area 39. The value of the current bet for an area 39 is known by the system 31 and is displayed by the display 41. If desired, the winnings of the players can be tracked by summing the value of chips placed on the player win placement areas 41 and the dealer's overall win-loss record can be tracked as well as the dealer's win-loss record for each of the players in the game. In addition, when a player buys chips, the dealer removes chips from the chip tray 45 and places them on the chips for cash area 43 and the total value of chips placed on the chips for cash area 43 over a period of time can be summed by the electronic system 31. The total value of chips placed on the area 43 should be equal the cash received by the dealer during his tenure at the table 19a.

Figure 5:
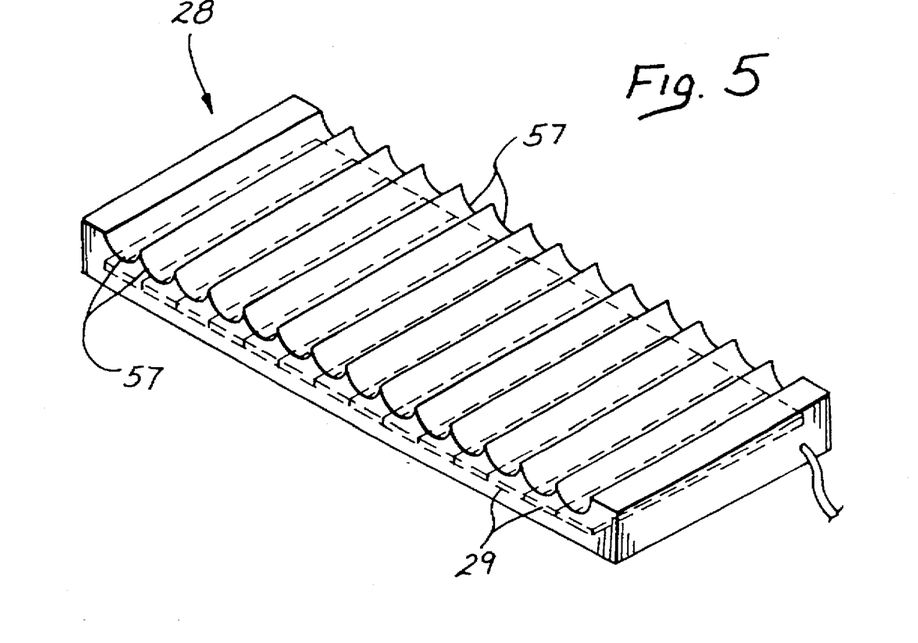
FIG. 5 is a perspective view of a chip tray constructed in accordance with the teachings of this invention.

The gaming chips 13 placed into and removed from the chip tray 28 can also be monitored by placing one or more of the antennas 29 in the chip tray 28 (FIG. 5). The chip tray 28 may be conventional to the extent that it has a series of parallel grooves 57 sized to receive and store the gaming chips 13. The chip tray 28 departs from the conventional in having a plurality of the antennas 29 within and carried by the tray. In the form shown in FIG. 5, one of the antennas 29 is provided beneath each of the grooves 57 for detecting of the gaming chips 13 in the associated groove. The antennas 29 of the chip tray 28 are also coupled to electronic system 31 so that the identity and value, including the total value, of the gaming chips in the tray 28 is known by the system 11.

Figure 6:
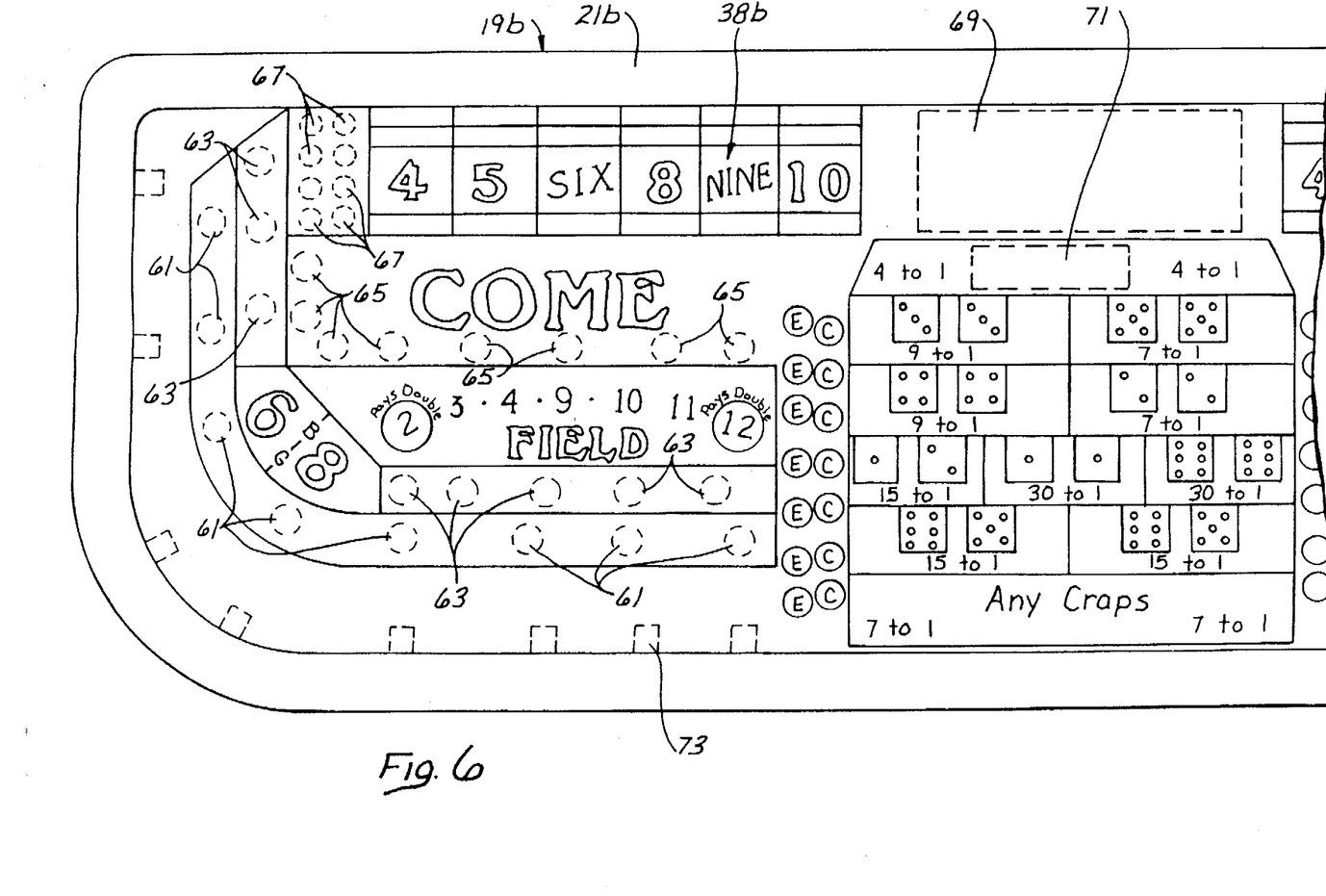
FIG. 6 is a fragmentary plan view of a craps table constructed in accordance with the teachings of this invention.

FIG. 6 shows one way in which the system 11 can be adapted for craps. FIG. 6 shows a craps table 19b which can be used in the system of FIG. 1 in place of the schematically illustrated gaming table 19. The craps table 19 may be of a conventional configuration in plan and its upper surface 21b has indicia 38b which adapts the surface 21b for craps. In addition, the indicia 38b defines a number of bet placement areas suitable for craps. Specifically, the indicia 38b provides pass line bet placement areas 61, don't pass bet placement areas 63, come bet placement areas 65 and don't come bet placement areas 67. The craps table 19b shown in FIG. 6 has a second set of the bet placement areas 61, 63, 65 and 67. There are 8 sets of bet placement areas 61, 63, 65 and 67, one for each player position at the table 19b. There is also an antenna beneath each of the areas 61, 63, 65 and 67 and this construction may be substantially as shown by way of example in FIG. 4.

The indicia 38b also defines a chip storage area 69 where the chips of the house are stored and a chips for cash area 71. The area 69 is in lieu of the chip tray and for cash area 71 is much like the chips for cash area 43 described above in connection with FIG. 5. Thus, one or more antennas may be imbedded in the table 19b as shown by way of example in FIG. 4 beneath the areas 69 and 71 to enable identifying and determining the value of the chips in these two areas. Card readers 73 may be used to read the identification cards of the players at the table 19b with one of such readers being provided for each of the play stations. The other portions of the table 19b may be conventional for a craps table.

By utilizing the table 19b and the system 11, the amount bet by each player can be determined and the total value of chips sold by the game operator is also automatically tracked. Because the chips at each of the chip placement areas on any of the gaming tables are identified, the movement of the chips from one chip placement area to the next can be tracked.

The employment of a read-write tag 17 in each gaming chip 13, and the use of associated antennas 29 having the ability to both read and write to the chips 13 is particularly advantageous in providing the opportunity to utilize a comprehensive security system in connection with a casino's gaming chips. Typically, using the teachings of the present invention, at the point of manufacture each chip will have imbedded in its tag an unalterable permanent I.D. code dedicated exclusively to each participating casino. Then, upon receiving, testing for reliability, and accepting each chip shipment, each casino will have the added capability of imbedding the casino's own security code, which may be later updated or nullified by that casino.

Figure 7:
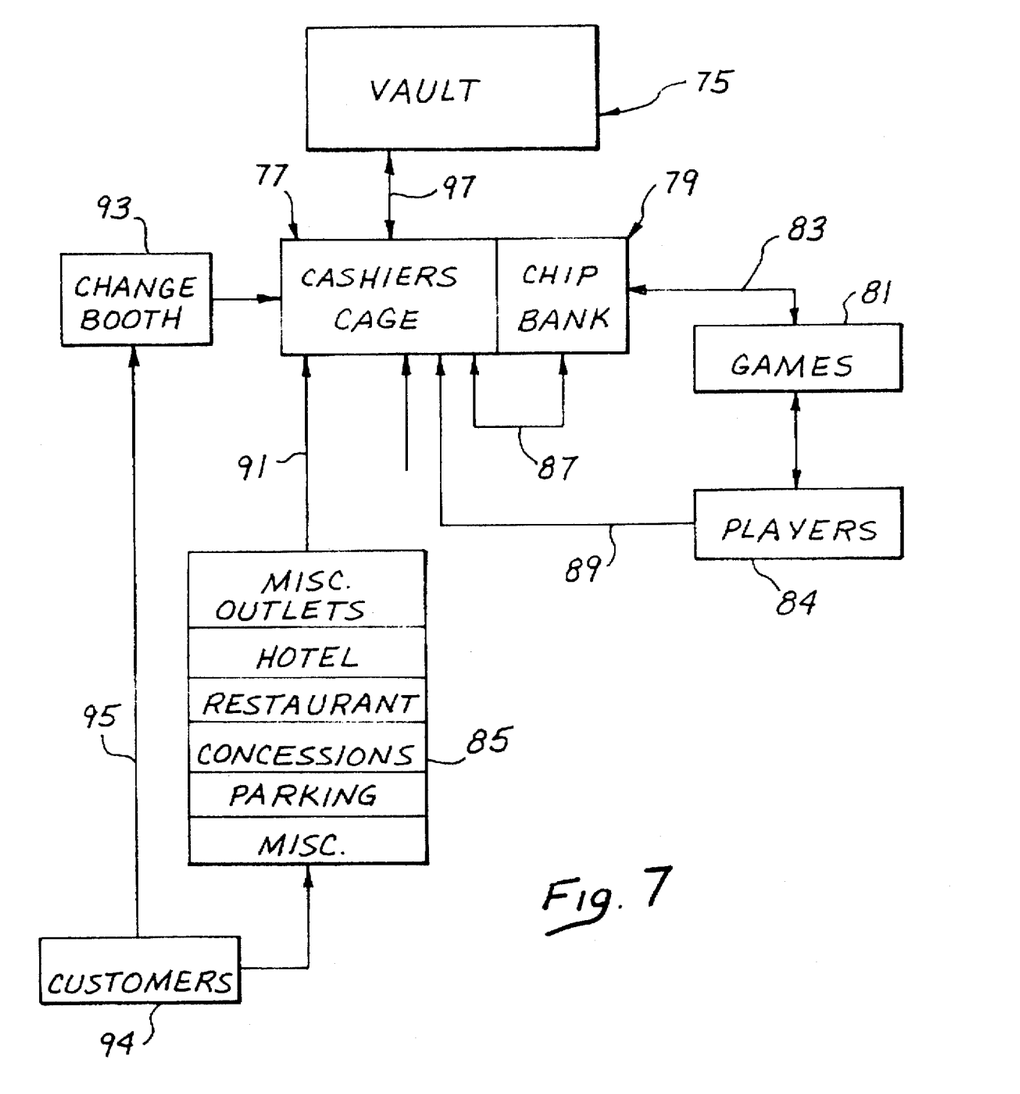
FIG. 7 is a diagrammatic view of a typical gaming chip processing system in a casino.

Referring now to FIG. 7, there is shown a typical diagrammatic layout of the flow of gaming chips on a casino floor. Chips 13 are received in the casino vault 75, where they are stored until later needed in the cashier's cage 77. Chips are stored in the cashier's cage 77 for provision to the chip bank 79, from which chips 13 may be transferred back and forth to the various gaming tables, represented by the box 81. The two-way transfer of chips between the chip bank 79 and the gaming tables 81 is represented by the double-headed arrow 83. Chips also are received into the cashiers cage 77 from the players, represented by box 84, the chip bank 79, and miscellaneous outlets, shown in box 85, including the hotel, restaurants, and other concessions. These outlets can sometimes include other casinos as well, if the casino has an agreement with another casino to honor the other casino's chips. The two-way chip transfer between the cashier's cage 77 and the chip bank 79 is represented by the double-headed arrow 87. Chips may only flow into the cashiers cage directly from the players and the miscellaneous outlets, as shown by the single-headed arrows 89 and 91.

The change booth 93 represents another means by which players or customers 94 can cash in gaming chips, as represented by the single-headed arrow 95. The change booth 93 then periodically returns the chips to the cashiers cage 77 for storage. If the cashiers cage accumulates excess gaming chips, the excess is returned to the vault 75 for storage, as represented by the double-headed arrow 97.

Figure 8:
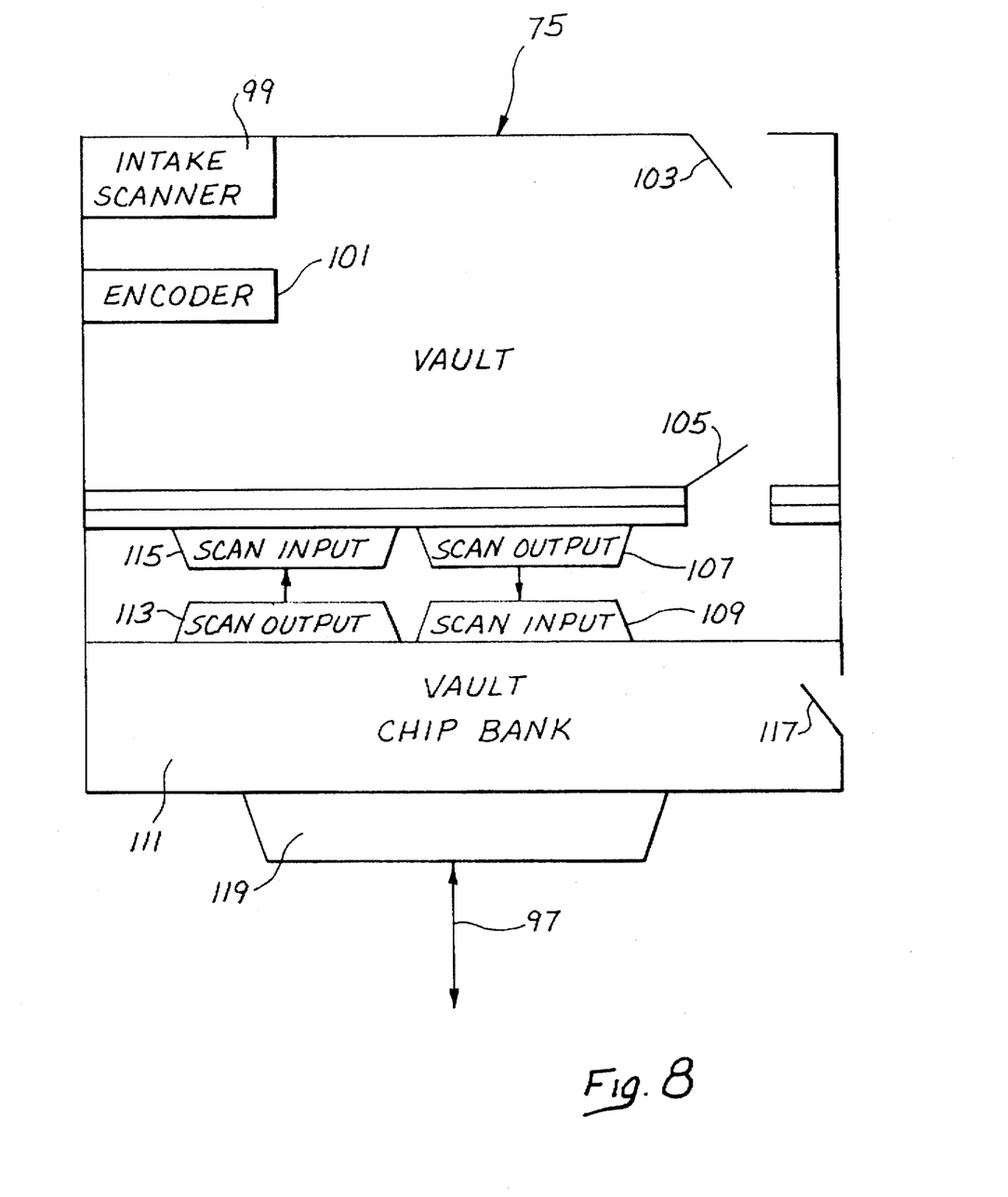
FIG. 8 is a diagrammatic view of the vault shown in FIG. 7, illustrating one preferred arrangement for installation of the inventive gaming chip tracking system in the vault.

FIG. 8 is a schematic representation of the vault 75, illustrating one preferred application of the inventive system for inventorying and tracking gaming chips. When gaming chips are received from the manufacturer, they are checked by casino vault personnel by electronically reading the chips for authenticity, using an intake scanner 99 which incorporates an antenna of the type earlier described. Then, using an encoder 101, which also employs a read-write antenna of the type earlier described, accepted chips are optionally encoded with a voidable casino security code, written directly to the transponder 17 within the chip. Following this encoding step, the chips are stored until ready for use. Doors 103 and 105 are preferably continuously scanned to detect unauthorized movement of chips into or out of the vault. Preferably, there are also custom radio frequency antennas in the vault that periodically communicate with all of the chips within the power range of the antennas. Thus, a running inventory of the chips stored in the vault is maintained.

When it is desired to transfer chips out of the vault 75, the chips are placed adjacent to a scan output device 107 that registers the chips as having exited the vault 75 by each chip's unique code and its relevant denomination. Additionally, the scan output device 107 writes a new code to the transponder 17 of the chip 13 (FIG. 2), documenting and preserving the transfer from the vault in the chip's history record. The chips then similarly are placed adjacent to a scan input device 109 which registers the chips as having entered into the vault chip bank 107, from whence they are available for transfer directly to the cashiers cage 77. The scanners 107 and 109 operate in the same manner to one another, as do the output and input scanners 113 and 115, respectively, which are utilized when transferring chips from the vault chip bank 111 back into the vault 75. Door 117 of the vault chip bank is scanned in the same manner as are doors 103 and 105 of the vault. When chips are transferred to or from the cashiers cage 77 along path 97, they are placed adjacent to the scanning device 119 for recordal of the transaction by the electronic system 31 and imprinting of the transaction on the chip history stored in the transponder 17.

Of course, the foregoing description of a preferred vault embodiment, as well as the further system details presented below, are purely illustrative. What is truly important to the system is the ability to scan and check the incoming chips, add a casino-specific voidable security code to the chip transponder, and record each movement of the chips into or out of the vault. The ability to record the chip transactional history onto a data bank within the chip transponder on a real time basis is also an important inventive feature, permitting the ability of the electronic system 31 to determine, at any time, whether or not a particular chip is properly documented or is suspect, as will be described more fully below. Constructional details may be altered to suit particular desired system features. For example, the vault chip bank may be eliminated with the chips being transferred directly from the vault 75 to the cashiers cage 77. Also, any number of antenna devices (at least one) may be used to perform the aforementioned scanning and writing functions, depending upon the sophistication of the device, desired locations for performing the scanning functions, and other ordinary design considerations.

Figure 9:
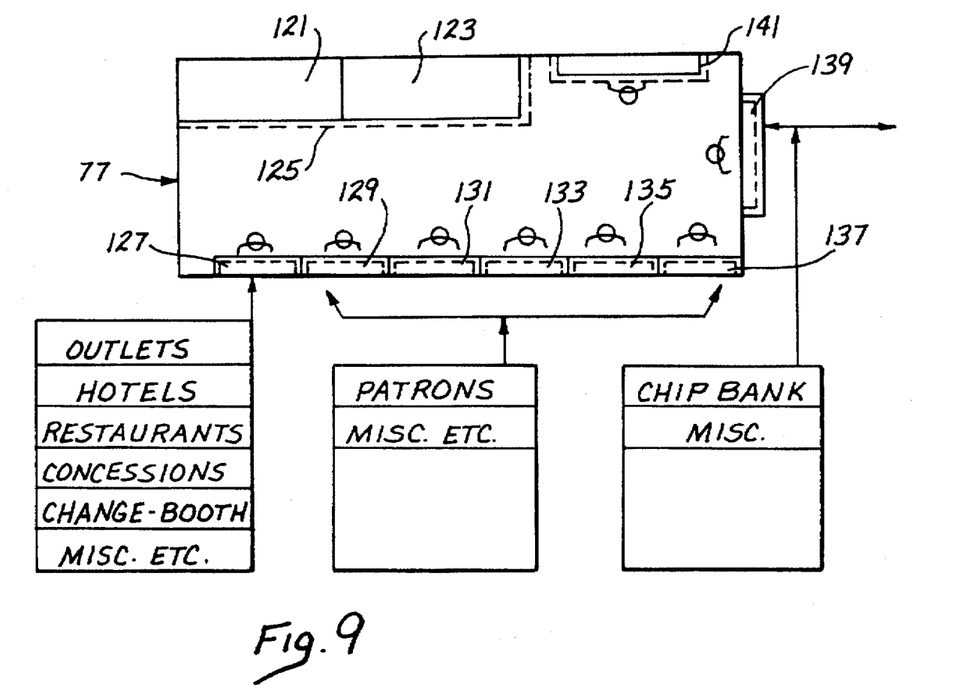
FIG. 9 is a diagrammatic view of the cashiers cage shown in FIG. 7, illustrating one preferred arrangement for installation of the inventive gaming chip tracking system in the cashiers cage.

FIG. 9 illustrates a typical cashiers cage 77, which includes a currency storage area 121, and a chip storage area 123. Around the two storage areas 121 and 123 is placed an RF antenna 125, which is preferably permanently embedded into the structure forming the cashiers cage, i.e. the counters or floor, so that whenever one or more chips is passed into or out of either area, the transaction is recorded and the validity of the chip is checked. Similar antennas 127, 129, 131, 133, 135, 137, 139, and 141 surround each teller work area within the cashiers cage, thereby ensuring that all chip movement into, out of, or within the cage is monitored by the electronic system 31, and the transaction is recorded in the chip's data bank in the tag 17. If any chip crossing any of the aforementioned antennas is counterfeit (i.e. does not have a valid identification code), or has an unusual transaction history, an appropriate action may be initiated, such as a message on a monitor screen alerting security personnel to the problem, the sounding of an alarm, or the like.

Figure 10:
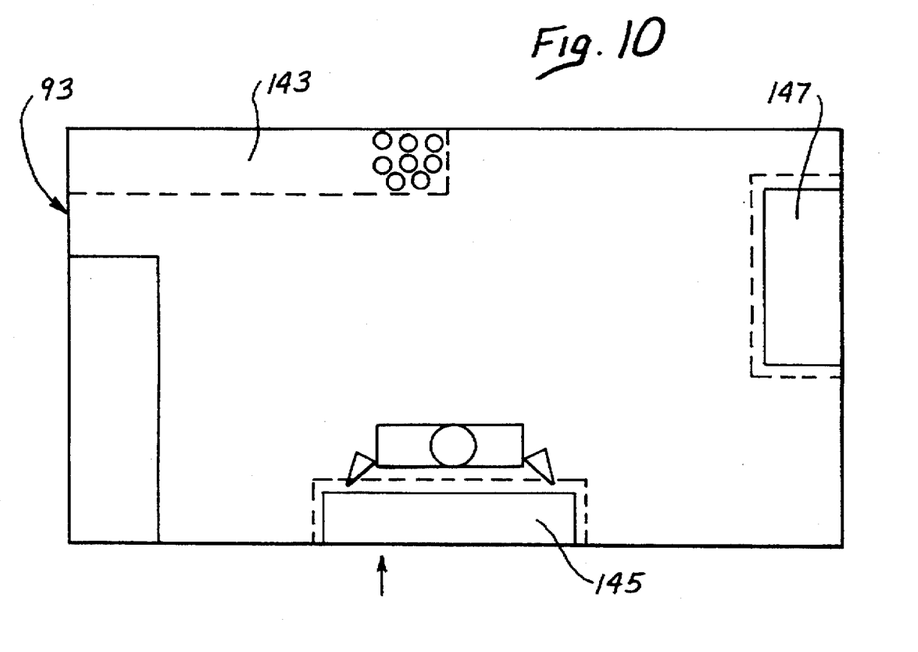
FIG. 10 is a diagrammatic view of the change booth shown in FIG. 7, illustrating one preferred arrangement for installation of the inventive gaming chip tracking system in the change booth.

FIG. 10 illustrates a typical change booth 93, which includes a chip storage area 143, a chip input area 145, and a chip exit area 147. In a manner similar to the cashiers cage, antennas 149, 151, and 153, respectively, surround each of the three areas 143, 145, and 147, so that any chip movement into, out of, or within the change booth is monitored and recorded.

The layouts as illustrated in FIGS. 9 and 10 are illustrative, and may be changed if desired. Such an approach may also be adapted to other casino facilities, such as the various other outlets within the casino where chips are accepted as legal tender, or the gaming tables. An important consideration is that the antennas be placed so that the chips must pass over them when transported from one location to another, and so that no additional effort is required to ensure that chip transactions are recorded by the system. Processing must be sufficiently efficient so that play on the tables is not slowed.

The system 31, as described herein and with use of the read-write capabilities of the antennas employed in conjunction with the system, is capable of performing a multitude of functions, resulting in greatly reduced cheating and the ability to significantly reduce the number of casino employees on the floor. For example, in a blackjack game, as herein described, the inventive system can read and relay data regarding the amount (by denomination or total) of every bet made on each individual betting spot, read and relay data regarding the amount in every dealer's bankroll tray (by denomination or total), and read and relay data and, if desired, trigger an alarm when an unusually large amount is bet or removed from the dealer's bankroll tray. It can further read and relay data regarding the amount bet on any betting spot to the player's history data bank when the player places his card in the card holder associated with that area, read and relay data regarding payoffs to each area, thereby ensuring correct payoffs, and read and relay data regarding all chips exchanged for cash.

On a casino-wide basis, counterfeit chips, or chips having a suspect transactional history (i.e. a chip appearing directly on the gaming table from the vault, without passing through the cashier's cage), are recognizable by the system at the games, in the cage, in the chip bank, or in the vault, and may be invalidated either by nullifying the security code carried by the chip tag 17 or by categorizing the chip as invalid in the database of the system 31. The system additionally provides for the opportunity to account for every chip owned by the casino or in play, instantaneously. A running inventory may be maintained of all chips in games bankrolls, the cashiers cage, the vault, the chip bank, any outlet, and any change booth, as well as chips that have been bet in any given period of time. Productivity can be measured by dealer, game type, spread of games, and location of games. The system can instantly identify the most recent location of any chip, and can accurately rate each player and issue "comps" to the players as merited, using "comp"-dispensing terminals scattered about the casino floor and actuated by input of a players identification card, thereby eliminating the need for pit personnel to perform these functions. Pit personnel can be alerted to large or unusual betting activity. In the event chips are stolen from a gaming table, player, or runner, the stolen chips can be identified and invalidated, thereby greatly reducing the problem of chip theft. If a blackout or other catastrophic event befalls the casino, all scannable chips can be instantly invalidated, if desired, in order to prevent large-scale theft. The scannable chips would usually include all casino-owned chips and all chips in play on the tables, and would exclude only player-owned gaming chips which were out of range of any system antenna. Of course, the system would preferably be provided with backup power in the event of a blackout to enable continued functioning.

Although exemplary embodiments of the invention have been shown and described, many changes, modifications, and substitutions may be made by one having ordinary skill in the art without necessarily departing from the spirit and scope of this invention. For example, the inventive concept is not necessarily limited to gaming chips. Currency could be banded with bands which include transponders similar to the transponders 17 utilized in the gaming chips, so that currency could be tracked and monitored as well.

What is claimed is:

1. A gaming chip, comprising a body and a transponder carried within the body, said transponder being encoded with permanent read-only identification information and further having a data bank for receiving and maintaining changeable information transmitted thereto from an RF antenna.

2. A gaming chip, as recited in claim 1, wherein said changeable information comprises a transactional history of the chip within a casino.

3. A gaming chip, as recited in claim 1, wherein said changeable information comprises a voidable casino security code.

4. A system for tracking movement of gaming chips within a casino, wherein the gaming chips carry electronically ascertainable information about the gaming chips, the casino comprising a vault for receiving and storing gaming chips, a cashiers cage for disbursing and cashing out gaming chips, and a plurality of gaming tables, the system comprising:
   at least one antenna associated with said vault for scanning gaming chips entering and leaving said vault;
   at least one antenna associated with said cashiers cage for scanning gaming chips entering and leaving said cashiers cage; and
   at least one antenna associated with said gaming tables, for scanning gaming chips at said tables.

5. The system as recited in claim 4, and further comprising an electronic control system for controlling the antennas in said vault, said cashiers cage, and said gaming tables, and for processing information received by the antennas when scanning the gaming chips.

6. The system as recited in claim 5, wherein said electronic control system is capable of maintaining a running inventory of all of the gaming chips in said casino, by value and by location, and is further capable of identifying and nullifying invalid or counterfeit chips.

7. The system as recited in claim 5, wherein each movement of a gaming chip between locations within the casino is recorded as the chip's transactional history, and said electronic control system is capable of identifying a gaming chip which is not in a location indicated by the transactional history for that chip.

8. The system as recited in claim 7, wherein the scanning steps include encoding information onto a data bank carded by the chip regarding the movement of the chip from one location to another within the casino, so that the chip's transactional history is maintained in said data bank.

9. The system as recited in claim 7, wherein the electronic control system is capable of invalidating a gaming chip not found in a location indicated by the chip's transactional history.

10. The system as recited in claim 5, wherein the electronic control system is capable of invalidating all scannable gaming chips in the casino in the event of an emergency.

11. The system as recited in claim 5, and further comprising means for identifying players in said casino, wherein the electronic system is capable of rating a particular player's performance based upon data obtained from tracking the gaming chips.

12. The system as recited in claim 4, wherein an antenna is located adjacent to each door in said vault, so that gaming chips being transported through any of said vault doors are scanned by an antenna.

13. The system as recited in claim 4, wherein an antenna is located adjacent to each access opening into said cashiers cage, so that all gaming chips being transported into or out of the cashiers cage are scanned by an antenna.

14. The system as recited in claim 13, wherein the antennas for said cashiers cage are embedded in the structure forming the cashiers cage.

15. The system as recited in claim 5, and further comprising a camera and means responsive to a particular signal from one of said antennas for actuating the camera.

16. A method of tracking movement of gaming chips in a casino, comprising:
   electronically identifying an electronically identifiable gaming chip at a first location within the casino;
   moving said gaming chip from said first location to a second location within said casino;
   electronically identifying said gaming chip at a second location within said casino; and
   recording the movement of the gaming chip from said first location to said second location in a data bank so that the transactional history of the gaming chip is preserved for future reference.

17. The method as recited in claim 16, wherein the data bank is disposed in a transponder carded by the gaming chip.

18. The method as recited in claim 16, wherein the casino includes a vault for receiving and storing gaming chips, a cashiers cage for disbursing and cashing out gaming chips, and a plurality of gaming tables, the method further comprising the steps of:
   electronically scanning all gaming chips entering and leaving the vault;
   electronically scanning all gaming chips entering and leaving the cashiers cage;
   electronically scanning all gaming chips cashed in, cashed out, and played on said gaming tables; and
   processing the information received from the scanning steps in order to maintain a running gaming chip inventory within the casino by value and chip location.

19. The method as recited in claim 18, wherein the vault scanning step further includes the step of encoding a voidable casino security code in a data bank carded by said chip.

20. The method as recited in claim 18, wherein the scanning steps further include the step of encoding additional information in a data bank carried by each gaming chip each time it is moved from one location to another, thereby building a readable transaction history for each individual gaming chip.

21. The method as recited in claim 18, wherein the scanning steps further include the step of reading the transactional history for each individual gaming chip.

22. The method as recited in claim 21, and further comprising the step of comparing each gaming chip's transactional history to its present location, and identifying any gaming chip not located in the location indicated by its transactional history.

23. The method as recited in claim 18, and further including the step of electronically invalidating any gaming chip identified as having no identification code or an invalid identification code.

24. The method as recited in claim 18, and further including the step of electronically invalidating all scannable gaming chips in the casino in the event of an emergency.

25. The method as recited in claim 18, wherein said includes a camera, the method further comprising the step of activating the camera responsive to a particular signal received during one of said scanning steps.

26. The method as recited in claim 18, and further comprising the step of receiving identification information related to players in the casino, the processing step including the step of rating each identified player by amount bet and winning percentage.

\* \* \* \* \*